March 19, 1935.   F. HEALY   1,995,098
FAUCET
Filed July 29, 1933
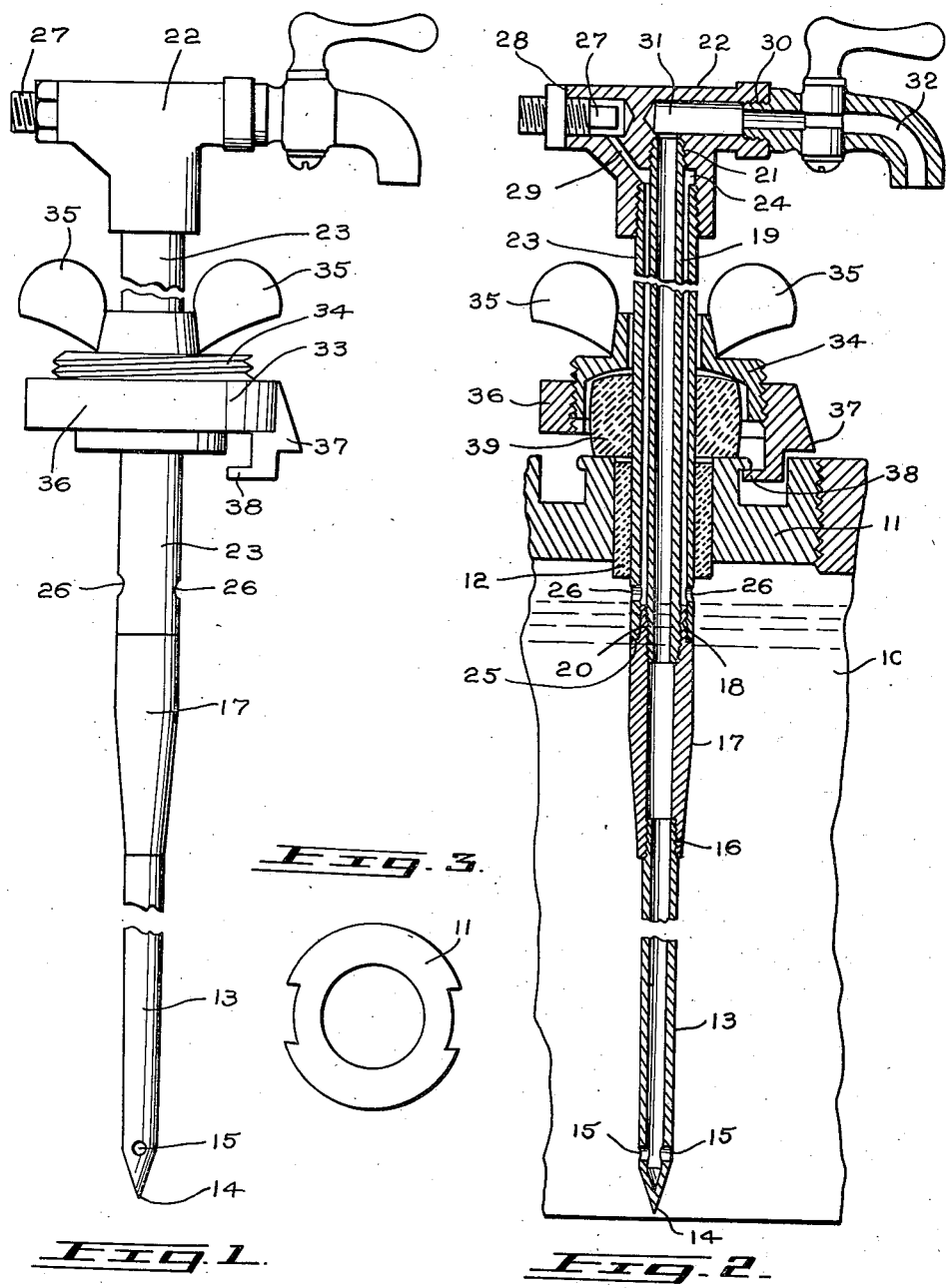
INVENTOR
Frank Healy
By Ralph Burch
Attorney Patented Mar. 19, 1935

1,995,098

UNITED STATES PATENT OFFICE 1,995,098

FAUCET

Frank Healy, Sandwich, Ontario, Canada

Application July 29, 1933, Serial No. 682,834

6 Claims. (Cl. 225—3)

This invention relates to a device for withdrawing aerated or other beverages from kegs, jars, bottles or other containers equipped with cork, rubber or other soft bungs or stoppers through which it penetrates, being so constructed as to allow the use of an automobile tire pump or other air lead from a compressor or cylinder in order to force pressure into container above the contents and thus, if desired, hold such contents under pressure, to be withdrawn at will. Certain beverages, of which beer is an example must be held under pressure from above in order to retain their flavour.

With these and other objects in view that may appear while the description proceeds, the invention consists in the novel construction and arrangement of parts as hereinafter more specifically set forth, claimed and shown in the accompanying drawing and in which:—

Fig. 1 is an outside elevation of my invention.

Fig. 2 is a cross-sectional view of a keg in part equipped with standard nipple showing also a longitudinal cross-sectional view of my device positioned therein.

Fig. 3 is a plan view of a standard nipple with which most kegs are equipped.

Referring more in detail to the drawing in which similar reference characters designate corresponding parts throughout the several views, the invention is designed for use with a keg or other container 10 equipped with a standard nipple 11 screwed therein and adapted to receive a pump which is usually inserted therein by driving the cork 12 into the keg. In connection with the present invention the said cork remains in position in the said nipple and the lower part of the device comprising a slender hollow tube 13 which terminates in a sharp point 14 is pushed through the same thus utilizing the said cork 12 as an insulator. The said tube 13 is provided with orifice 15 drilled through both sides and near the lower extremity thereof and is threaded at the upper end 16 to engage a tapered ferrule 17 which is threaded on the inside to accommodate the same. The ferrule 17 terminates at its upper end in a shoulder 18 which is also threaded inside. A hollow metal tube 19 of the same diameter as the tube 13 and provided with outside threads at each end is screwed into the said ferrule 17 at 20 and the upper end 21 thereof is screwed into a head 22 which is also threaded to receive the same. Another hollow tube 23 of sufficient inside diameter to allow the tube 19 to pass through and leave a small clearance is threaded on the outside at the upper end and screwed into the head 22, a clearance 24 being provided beyond the end of the thread so that the tube will not go all the way up. The lower end passes over the shoulder 18 of the ferrule 17 and is drawn tightly thereto at 25 by reason of the tightening of the tube 19 into the head 22 and ferrule 17. Orifices 26 are provided in the said tube 23 which barely clear the top of the shoulder 18 of the ferrule 17. An air valve 27 of standard design, similar to that used in a bicycle tire is screwed into the head 22 at 28 and is of smaller diameter beyond the thread to allow for clearance. A passage 29 in the head 22 is provided to allow air from the valve to pass through to the tube 23 by way of the clearance 24 above the end of the same. The head 22 is also threaded inside at 30, and hollowed inside to form a passage 31 connecting with the tube 19, and an ordinary cock or faucet 32 connected therein.

A compression coupling 33 comprising a hollow plug 34 is threaded on the outside and equipped with wings 35 to facilitate turning by hand and a hollow ring 36 is threaded on the inside to accommodate the said plug 34. Said ring having an elongated shoulder 37 on one side and a spur 38 projecting inwardly therefrom. A rubber gasket 39 is fitted into the hollow plug 34 and has a vertical hole through the center thereof to accommodate the tube 23. The use of the compression coupling 33 is confined to kegs equipped with the usual standard nipple, the device being designed to utilize the cork with which most kegs are equipped as an insulator, and it is only by reason of the fact that a small cork is used in the nipple that coupling 33 is necessary and then only as a precautionary measure, there being a tendency for a small cork to break, should this occur the coupling will prevent leaking. In a keg not equipped with the nipple the cork is of sufficient diameter to allow for expansion without breaking, hence the coupling is dispensed with. It is therefore apparent that this device can be used on kegs or containers equipped with the nipple or without; a departure from the usual beer pump in that the latter is confined to use on kegs equipped with the nipple only.

In using the device in a keg equipped with nipple, compression coupling 33 is first detached from the device and placed over the nipple, spur 38 passing through one of the notches in nipple and being turned so as to remain firmly in place, shoulder 37 resting on the outer edge, thus making it impossible to detach the coupling without first turning spur 38 in the reverse direction. Plug 34 is turned down into ring 36 very slightly compressing rubber gasket 39. Point 14 is then inserted through the hole in gasket 39 so that it rests on the top of cork 12. The device is then turned in a clock-wise direction by using the head 22 as a handle, slight pressure being exerted at the same time, thus forcing the point 14 and the tube 13 through the cork 12 until the tapered ferrule 17 and the tube 23 also pass through the cork 12 until orifices 26 are just below the cork 12, and the latter by reason of the fact that it has been pierced and gradually expanded in the process, becomes a perfect insulator for the device. Should, however, the cork 12 split through the above operation, the plug 33 can be further tightened, thus preventing any loss of compression. This operation is obviously not necessary should the keg be equipped with the ordinary large cork and without a nipple, the point 14 being simply placed in the centre of the cork and the device forced through in the same manner.

By reason of the fact that an aerated or carbonated beverage is placed in a keg under pressure, by simply turning the handle of cock or faucet 32, the liquid enters the orifices 15 and passes through the tube 13, ferrule 17, tube 19 and passage 31 to exit through cock or faucet 32, the latter being so positioned as to allow any drip to fall within the chime or depressed portion of the head of the keg.

Thus it will be readily seen that this device provides an economical and cleanly method of withdrawing aerated or carbonated beverages from containers at will and also for aerating and retaining them indefinitely under pressure, the cork in the container acting as an insulator, thus preventing leak while tapping or withdrawing, and effectively sealing the opening in container when not in use. When necessary to apply pressure an automobile tire pump or air line can be attached to valve 27 and air forced through passage 29 in head 22 into and along the inside of tube 23 to exit through orifices 26 into the container above the liquid which it does not injure by passing through it. A further advantage is the fact that breweries or others do not require any special equipment in kegs equipped with special nipples which are costly, but may turn out their product in an ordinary keg in which a hole is bored and an ordinary cork inserted.

It is believed that the construction and advantages of the structure shown may be apparent from the foregoing paragraphs taken in conjunction with the accompanying drawing without further detailed description.

While the preferred embodiment of the invention has been disclosed, it is understood that minor changes in the details of construction, combination and arrangement of co-operating elements may be resorted to within the scope of what is claimed without departing from the spirit of the invention.

I claim:

1. In a faucet of the type described, a hollow tube with orifices near the lower end thereof, said end being pointed and adapted to be forced through a cork, a tapered ferrule threadably mounted on the upper end thereof, an upper tube of corresponding diameter fitted into said ferrule, an outer tube positioned over said upper tube and arranged concentrically therewith in a manner to provide an air space therebetween said outer tube, likewise being secured to said tapered ferrule, and having orifices near the lower end thereof, a head connected to said upper and outer tubes, air valve means in said head having connection with said air space, and an outlet valve secured in said head and connected with said hollow tube.

2. In a faucet of the type described, a hollow tube with orifices near the lower end thereof, said end being pointed and adapted to be forced through a cork, a tapered ferrule threadably mounted on the upper end thereof, an upper tube of corresponding diameter fitted into said ferrule, an outer tube positioned over said upper tube and arranged concentrically therewith in a manner to provide an air space therebetween said outer tube, likewise being secured to said tapered ferrule, and having orifices near the lower end thereof, a head connected to said upper and outer tubes, air valve means in said head having connection with said air space, outlet valve means secured in said head and connected with said hollow tube, a rubber gasket on said outer tube and means tightening same to a standard keg nipple.

3. In a faucet of the type described a hollow tube with orifices near the lower end thereof, said end being pointed and adapted to be forced through a cork, a tapered ferrule threadably mounted on the upper end thereof, an upper tube of corresponding diameter fitted into said ferrule, an outer tube positioned over said upper tube and arranged concentrically therewith in a manner to provide an air space therebetween said outer tube, likewise being secured to said tapered ferrule, and having orifices near the lower end thereof, a head connected to said upper and outer tubes, air valve means in said head having connection with said air space, outlet valve means secured in said head and connected with said hollow tube, a rubber gasket fitted on said outer tubes and a compression coupling therefor adapted to engage a standard keg nipple.

4. In a faucet of the type described, a hollow tube with orifices near the lower end thereof, said end being pointed and adapted to be forced through a cork, a tapered ferrule threadably mounted on the upper end thereof, an upper tube of corresponding diameter fitted into said ferrule, an outer tube positioned over said upper tube and arranged concentrically therewith in a manner to provide an air space therebetween said outer tube, likewise being secured to said tapered ferrule, and having orifices near the lower end thereof, a head connected to said upper and outer tubes, air valve means in said head having connection with said air space, outlet valve means secured in said head and connected with said hollow tube, a rubber gasket fitted on said outer tube, a hollow ring threaded internally having a shoulder thereon and an inward projecting spur on said shoulder adapted to engage a standard keg nipple, a hollow plug threadably engaging said ring and means thereon by which the same is turned, said hollow plug fitting over said rubber gasket pressing same to said tube and nipple as the device is tightened substantially as set forth.

5. In a faucet of the type described, a central tube having its lower end pointed and provided with orifices, an outer tube positioned over the upper end of said central tube and arranged in concentric spaced relation to provide an air space between said tubes, said outer tube having its lower end joined with said central tube in merging relation therewith and provided near its lower end with orifices, air supply means connected with the air space between said tubes and outlet valve means connected to said central tube.

6. In a faucet of the type described, a central tube having its lower end pointed and provided with orifices, an enlargement intermediate the length of said tube tapered into merging relation with said tube, an outer tube positioned on the upper end of said central tube arranged in concentric spaced relation thereto to provide an air space between said tubes, the lower end of said outer tube being connected to said enlargement and provided with orifices, air supply means connected with the air space between said tubes, and outlet valve means connected to said central tube.

FRANK HEALY.